United States Patent
Shibukawa et al.

(10) Patent No.: US 10,904,402 B2
(45) Date of Patent: Jan. 26, 2021

(54) IMAGE PROCESSING APPARATUS, AND IMAGE PROCESSING METHOD

(71) Applicants: Tomoki Shibukawa, Tokyo (JP); Tomofumi Harada, Kanagawa (JP)

(72) Inventors: Tomoki Shibukawa, Tokyo (JP); Tomofumi Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 15/925,393

(22) Filed: Mar. 19, 2018

(65) Prior Publication Data

US 2018/0278756 A1 Sep. 27, 2018

(30) Foreign Application Priority Data

Mar. 21, 2017 (JP) ................................. 2017-054660

(51) Int. Cl.
*G06F 17/20* (2006.01)
*H04N 1/00* (2006.01)
*G06F 3/0481* (2013.01)

(52) U.S. Cl.
CPC ....... *H04N 1/0044* (2013.01); *G06F 3/04817* (2013.01); *H04N 1/00411* (2013.01);
(Continued)

(58) Field of Classification Search
CPC ............ G06F 3/04817; H04N 1/00474; H04N 1/00477; H04N 1/00482; H04N 1/0044; H04N 1/00411; H04N 1/00466
See application file for complete search history.

(56) References Cited

U.S. PATENT DOCUMENTS

| 2005/0105129 A1* | 5/2005 | Takahashi | H04N 1/00432 358/1.15 |
| 2005/0139673 A1* | 6/2005 | Yokoyama | H04N 1/00416 235/454 |

(Continued)

FOREIGN PATENT DOCUMENTS

| JP | 2004-266408 | 9/2004 |
| JP | 2010-004301 | 1/2010 |

(Continued)

OTHER PUBLICATIONS

Office Action dated Sep. 23, 2020, in corresponding Japanese application No. 2017-054660.

*Primary Examiner* — Shahid K Khan
(74) *Attorney, Agent, or Firm* — Oblon, McClelland, Maier & Neustadt, L.L.P.

(57) ABSTRACT

An image processing apparatus comprises a storage, an operation panel and processing circuitry. The processing circuitry is configured to receive a first operation input to execute a job utilizing a scanner, execute the job by controlling a scanner to scan a document, and generate a display component that indicates a processing result of the job based on setting information of the job. The processing circuitry is further configured to register history information that indicates the display component corresponding with the setting information, receive a second operation input to initiate a job execution application to select the display component, acquire the display component and the setting information from the history information, and control the operation panel to display a screen including the display component in a history list, the display component in the history list being selectable on the screen as a job setting.

17 Claims, 10 Drawing Sheets

(52) U.S. Cl.
CPC ..... *H04N 1/00466* (2013.01); *H04N 1/00474* (2013.01); *H04N 1/00477* (2013.01); *H04N 1/00482* (2013.01)

(56) References Cited

U.S. PATENT DOCUMENTS

| | | | | |
|---|---|---|---|---|
| 2005/0146731 A1* | 7/2005 | Mitani | ............... | H04N 1/00408 358/1.1 |
| 2006/0133844 A1* | 6/2006 | Konno | ................... | G06F 3/125 399/82 |
| 2006/0282782 A1* | 12/2006 | Yamada | ............. | H04N 1/00244 715/733 |
| 2008/0079997 A1* | 4/2008 | Kawano | ................ | G03G 15/36 358/1.15 |
| 2009/0040546 A1* | 2/2009 | Hirakawa | ........... | G06K 15/00 358/1.14 |
| 2009/0122342 A1* | 5/2009 | Kawano | ............... | H04N 1/00244 358/1.15 |
| 2009/0195819 A1* | 8/2009 | Sugimoto | .......... | H04N 1/00413 358/1.15 |
| 2009/0198838 A1* | 8/2009 | Murata | ............. | H04N 1/00411 710/8 |
| 2009/0217193 A1* | 8/2009 | Tanaka | ............... | H04N 1/00411 715/781 |
| 2009/0251729 A1* | 10/2009 | Nakawaki | .......... | H04N 1/00352 358/1.15 |
| 2010/0002252 A1* | 1/2010 | Yamaguchi | ........... | G03G 15/55 358/1.15 |
| 2010/0005167 A1* | 1/2010 | Kishimoto | ........ | H04N 1/00347 709/224 |
| 2010/0225978 A1* | 9/2010 | Yamaguchi | ........ | H04N 1/00244 358/474 |
| 2010/0241982 A1* | 9/2010 | Motosugi | .............. | G06F 3/1204 715/771 |
| 2011/0032567 A1* | 2/2011 | Ishida | ..................... | G06F 21/56 358/1.15 |
| 2011/0052242 A1* | 3/2011 | Kamata | ............. | G03G 15/5016 399/82 |
| 2012/0069394 A1* | 3/2012 | Ono | ........................ | G06F 3/121 358/1.15 |
| 2013/0007599 A1* | 1/2013 | Belfiore | ................ | G06F 17/217 715/243 |
| 2013/0169981 A1* | 7/2013 | Takahashi | ............ | G06F 3/1205 358/1.9 |
| 2013/0335774 A1* | 12/2013 | Kato | .................... | G06F 3/1296 358/1.15 |
| 2014/0078536 A1* | 3/2014 | Hamamoto | ........ | H04N 1/00411 358/1.13 |
| 2014/0126015 A1* | 5/2014 | Kaneko | ............. | G06K 15/1886 358/1.15 |
| 2014/0185069 A1* | 7/2014 | Seto | .................... | G06K 15/4065 358/1.9 |
| 2014/0331164 A1 | 11/2014 | Enomoto et al. | | |
| 2015/0138597 A1* | 5/2015 | Koshigaya | ......... | H04N 1/00973 358/1.15 |
| 2015/0222769 A1* | 8/2015 | Hino | .................. | H04N 1/00477 358/1.15 |
| 2016/0105582 A1* | 4/2016 | Nakajima | ............. | G06F 3/1238 358/1.15 |
| 2017/0163826 A1* | 6/2017 | Nakazawa | ......... | H04N 1/00506 |

FOREIGN PATENT DOCUMENTS

| | | |
|---|---|---|
| JP | 2012-020529 | 2/2012 |
| JP | 2014-219734 A | 11/2014 |
| JP | 2017-107528 A | 6/2017 |

* cited by examiner

IMAGE PROCESSING APPARATUS, AND IMAGE PROCESSING METHOD

CROSS REFERENCE TO RELATED APPLICATIONS AND PRIORITY INFORMATION

The present application is based upon and claims priority to Japanese Patent Application No. 2017-054660, filed in Japan on Mar. 21, 2017, the content of which is hereby incorporated by reference in its entirety.

BACKGROUND

Technical Field

The present invention relates to an Image processing apparatus and image processing method.

Description of the Related Art

In a conventional image processing apparatus, displaying image forming setting and registration of a setting is performed so that a user can select a setting easily when the user operates the touch panel.

For example, according to the related art in the Japanese Laid-Open Patent Publication No. 2014-219734, it is disclosed that a method of registering image processing conditions of information processing once set, and displaying a list of registered image processing conditions, and an image associated with the image processing condition.

However, conventional image processing apparatuses have a problem in which it may unclear what a result of the image processing will become for user, specifically, since the images of the processing is simplified, and the process names set by user are merely displayed.

The present application solves the above problems. Moreover, it is an object of the present application to show more clearly what a processing result of image processing will be for the user.

SUMMARY

According to an exemplary implementation of the present application, an image processing apparatus comprises a storage, an operation panel and processing circuitry. The processing circuitry is configured to receive a first operation input to execute a job utilizing a scanner, execute the job by controlling a scanner to scan a document, and generate a display component that indicates a processing result of the job based on setting information of the job. The processing circuitry is further configured to register history information that indicates the display component corresponding with the setting information, receive a second operation input to initiate a job execution application to select the display component, acquire the display component and the setting information from the history information, and control the operation panel to display a screen including the display component in a history list, the display component in the history list being selectable on the screen as a job setting.

The above and other objects, features, advantages and technical and industrial significance of this application will be better understood by the following detailed description, when considered in connection with the accompanying drawings.

BRIEF DESCRIPTION OF THE DRAWINGS

A more complete appreciation of the application and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
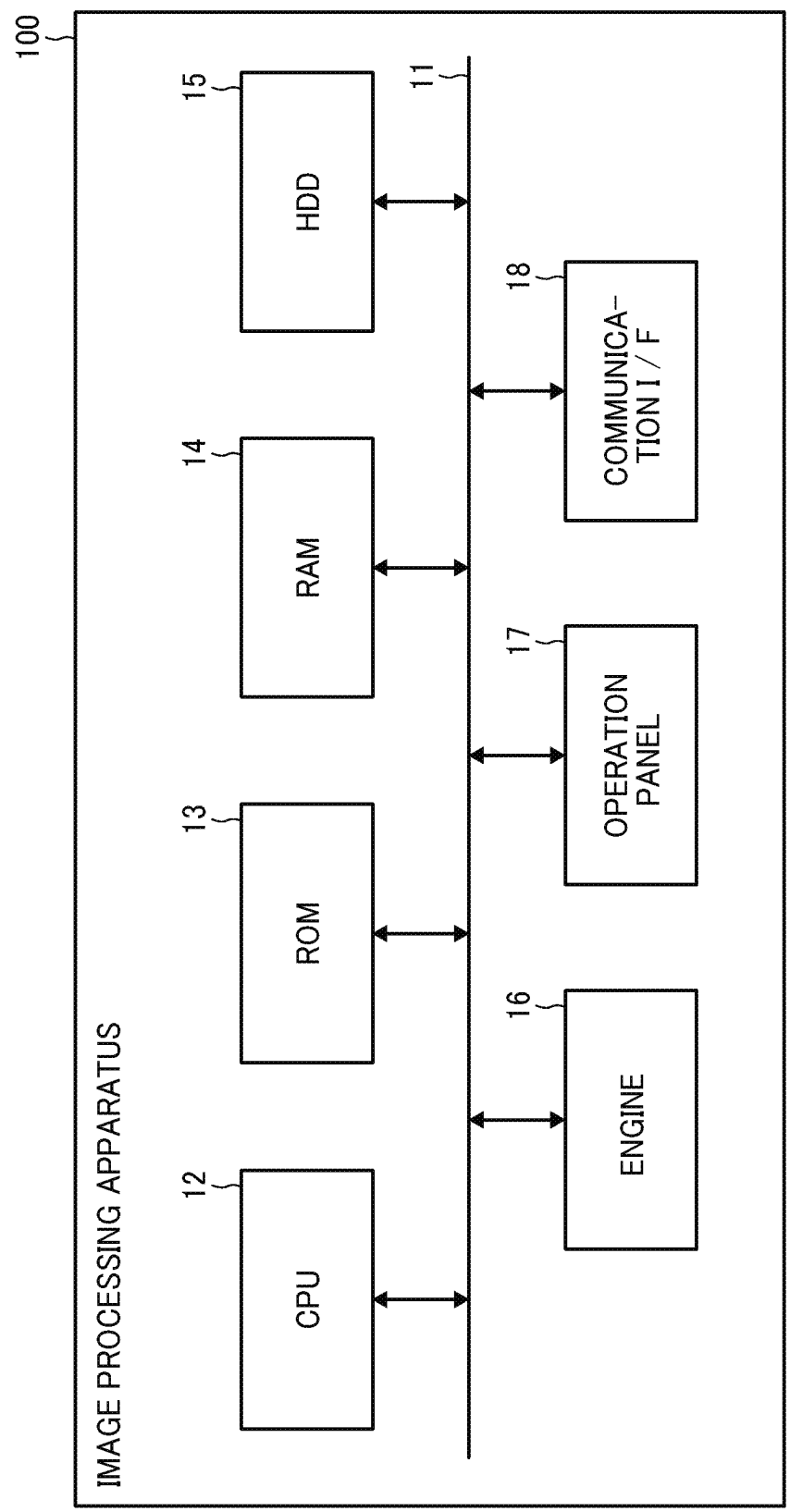
FIG. 1 is a block diagram showing an exemplary hardware configuration of an image processing apparatus.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include both single and multiple forms, unless the context clearly indicates otherwise.

Hereinafter, a description is given in detail of an image processing apparatus. In many instances, the image processing apparatus is described as a multifunction peripheral (MFP), but the present application is not limited to that. An image processing apparatus in accordance with the present application may be peripheral MFP or any other device having at least one function of a printing function, a copying function, a scanner function and a fax function.

With reference to FIG. 1, a hardware configuration of the image processing apparatus 100 will be described. FIG. 1 is a block diagram showing an exemplary hardware configuration of the image processing apparatus 100.

As shown in FIG. 1, the image processing apparatus 100 includes a CPU (Central Processing Unit) 12, a ROM (Read Only Memory) 13, a RAM (Random Access Memory) 14, and a HDD (Hard Disk Drive) 15. Further, the image processing apparatus 100 includes an engine 16, an operation panel 17, and a communication interface (I/F) 18. The above parts are mutually connected via a system bus 11.

The engine 16 executes various functions such as a copy function, a scanner function, a facsimile function, a printer function, and the like. And the engine 16 is hardware which perform information processing and image processing to implement these functions. For example, the engine 16 has a scanner that reads a document set on a reading device including a reading panel or a document feeder, a plotter that prints on a sheet material such as paper, a facsimile unit that performs fax communication, and the like. The engine 16 may also be provided with specific options such as a finisher for sorting printed sheet materials and an ADF (Auto Document Feeder) for automatically feeding originals.

The CPU 12 comprehensively controls the operation of the image processing apparatus 100. The CPU 12 executes one or more programs stored in memory (such as the ROM 13, the HDD 15, and RAM 14). RAM 14 may be utilized by CPU 12 as a work area. In exemplary implementations, the CPU 12 controls the entire operation of the image processing apparatus 100. That is, the CPU 12 controls the engine 16 to execute the above described copy function, scanner function, facsimile function, printer function, and the like.

In an exemplary implementation, CPU 12, in conjunction with any of ROM 13, RAM 14 and HDD 15, may be a general or specific-purpose processor, a digital signal processor (DSP), an ASIC, a field programmable gate array (FPGA) or other programmable logic device (PLD), a discrete gate or transistor logic, discrete hardware components or any other combination for executing functions to realize logic blocks. CPU 12 may include modules, parts, circuits and/or integrated circuits, all of which may be referred to as processing circuitry. The processing circuitry may include a general-purpose processor, and the processing circuitry may include any number of processors, controllers, micro-controllers or state machines. The processing circuitry can also be a combination of computer equipment, such as a combination of a DSP and a micro-processor, a combination of plural micro-processors, or a combination of a DSP and plural micro-processors. The processing circuitry of image processing apparatus 100 may separately or jointly implement each of functionality of the components illustrated in FIG. 1.

The operation panel 17 accepts various inputs according to the user operation and displays various images (screens). In particular, the operation panel 17 is a touch panel integrally including both an accepting function for accepting various inputs and a display function for displaying various images (screens). But it is not limited that. For example, the operation panel 17 (user interface) may be configured that an input device (like a hard key) is separate from a display device (a display monitor). In an exemplary implementation, the processing circuitry may control the operation panel 17 to display various images and the processing circuitry may receive user input via the operation panel 17.

The communication I/F 18 is an interface for communicating with an external device (for example, a client terminal or the like) via a network. In an exemplary implementation, the processing circuitry may control the communication I/F 18 to communicate via the network.

Next, with reference to FIG. 2, a functional configuration of the image processing apparatus 100 will be described. In particular, FIG. 2 is a block diagram showing an exemplary functional configuration of the image processing apparatus 100.

Figure 2:
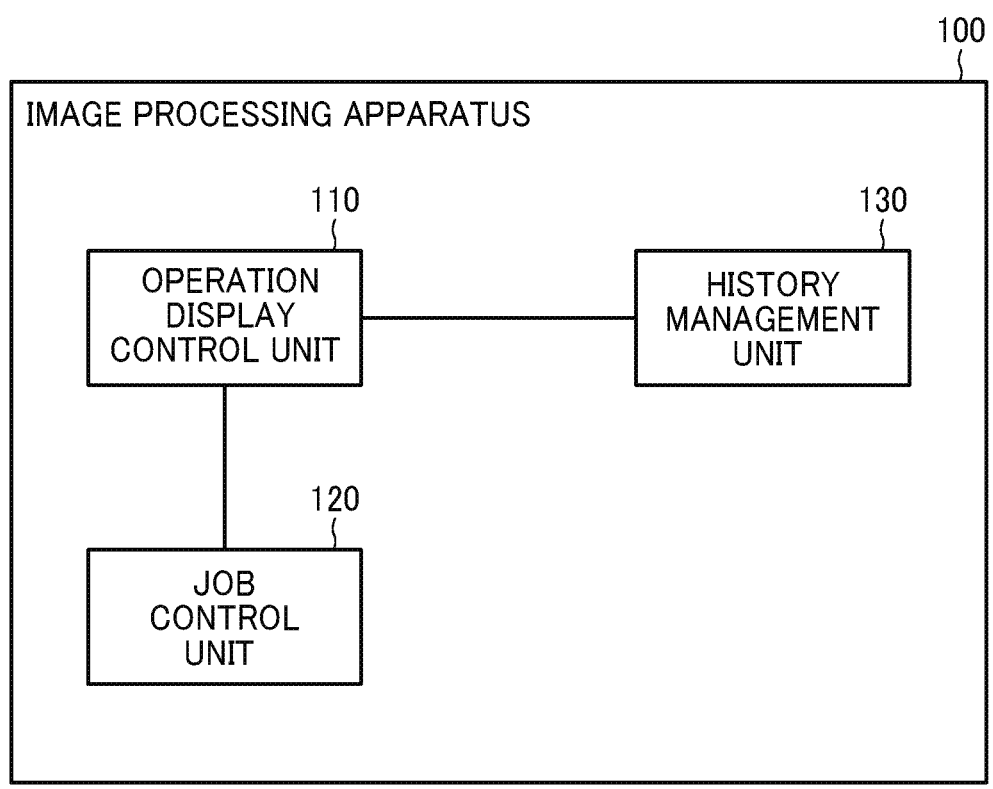
FIG. 2 is a block diagram showing an exemplary functional configuration of an image processing apparatus.

As shown in FIG. 2, the image processing apparatus 100 includes an operation display control unit 110, a job control unit 120, and a history management unit 130. Such units may be implemented by hardware, such as CPU 12, the processing circuitry or by specific integrated circuits (IC) or application specific ICs. Further, for example, each of the above units can be implemented by the CPU 12 (processing circuitry) that executes a program stored in the ROM 13 or the RAM 14.

The operation display control unit 110 executes various controls on the operation panel 17. More specifically, the operation display control unit 110 receives various kinds of information input in response to a user operation on the operation panel 17. For example, the operation display control unit 110 receives a job start instruction and job setting information by a user operation on the operation panel 17. The operation display control unit 110 requests the job control unit 120 to issue a job start instruction. The job is, for example, a copy job or a scan job or a print job.

Further, the operation display control unit 110 controls to output or display various information via the operation panel 17. For example, the operation display control unit 110 controls a processing progress, a processing result, and/or the output of other various information on the operation panel 17 by executing a job.

In addition, the operation display control unit 110 creates a display component (for example, an icon image, or a job setting button, or the like) for indicating the processing result image of the job with the job setting on the operation panel 17. The operation display control unit 110 may further include generating unit, which may be utilized to create the above described icon image based on the reading result of the document according to a past execution of a scanner function by the engine 16. A reading result is at least one setting information including a document size, a document direction, a printed paper size, and a print setting that is set previous job execution.

Execution of the scanner function by the engine 16 is implemented under the control of the job control unit 120. For example, the operation display control unit 110 gets (or received) the document size, document direction, transfer sheet size, print setting (for example, "aggregate (2 in 1)") from the engine 16 that has executed the scanner function under the control of the job control unit 120, and then the operation display control unit 110 generates an icon image for indicating the processing result of the job. The operation display control unit 110 outputs the job setting information and the generated icon image to the history management unit 130.

The icon image generated by the operation display control unit 110 may be used according to starting an application for selecting or executing job that using scanner or printer or copier or fax. For example, when the operation panel 17 receives the user operation to start an application for selecting a job on the operation panel 17, or when the job setting change is required by user in the application to execute the job, the operation display control unit 110 acquires history information (icon image, setting information, etc.) corresponding to the job, and controls to display on the operation panel 17 on the selectable history list screen. The operation display control unit 110 may also control to display the icon image as a job setting selection screen to be selected job settings. The history list screen includes icon images. As described above, the icon image is created from the reading result of the document so that the processing result of the job can be indicated. Therefore, a user that sees the history list screen including the icon image may easily recognize a specific process result.

For example, when a document to be copied (or scanned) is not set (e.g. the document is not placed on the scanner), a size of the direction of the document is unknown and thus the history list screen displays icon images including all size or direction of document. Further, when the document is set, the operation display control unit 110 acquires (or receives) the document size or direction of the document that is set, and the operation display control unit 110 then updates the history list screen as displaying only the icon image according to the size or direction of the document that is set. Specially, the operation display control unit 110 acquires (or receives) the document size or direction/orientation (document size of the set document) from the engine 16 that executes the scanner function.

Figure 3:
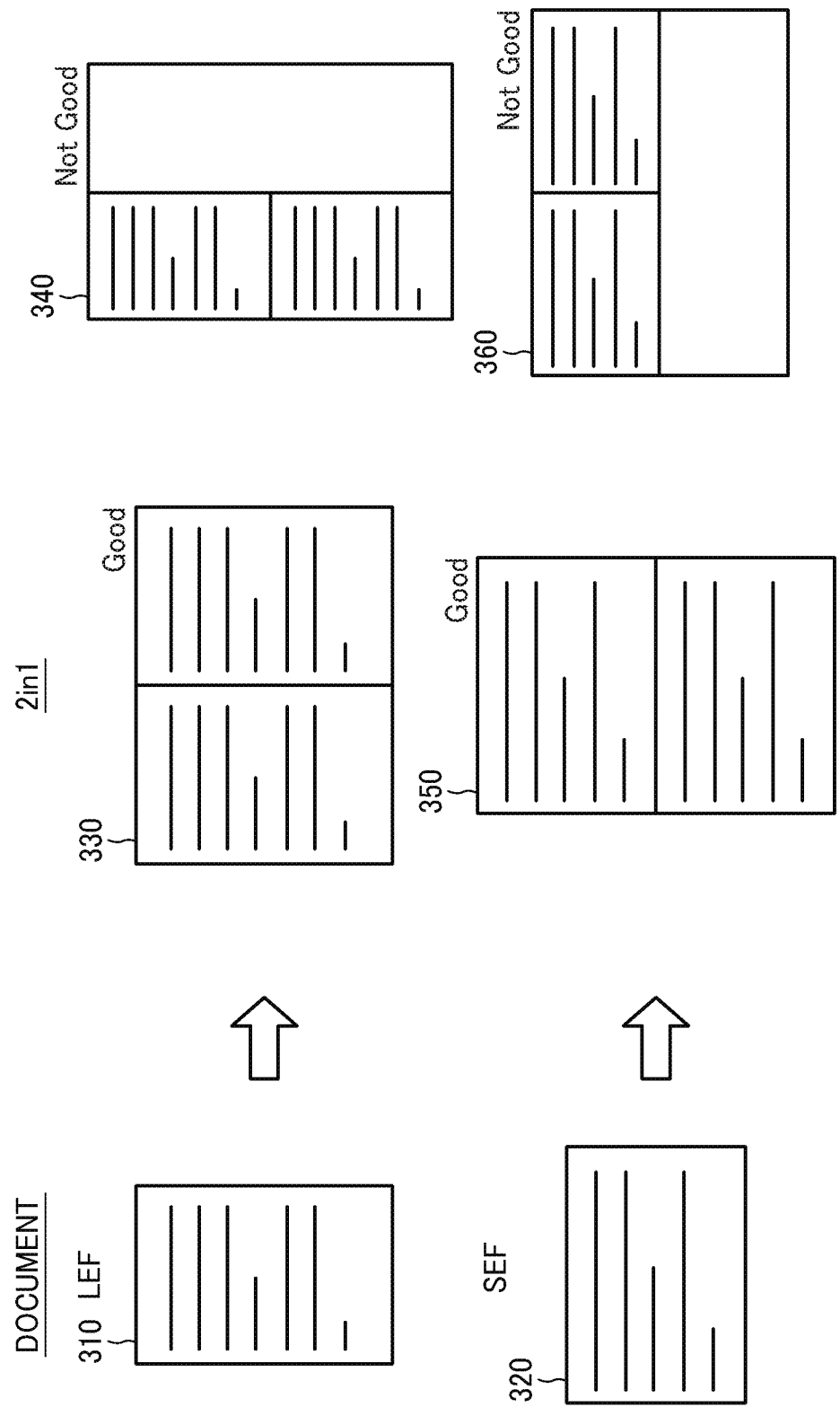
FIG. 3 is a diagram showing an example of creating an icon image.

FIG. 3 is a diagram showing an example of creating an icon image. In particular, FIG. 3 illustrates examples of creating icon images in an aggregation (2 in 1) in a long edge feed (LEF) mode indicating long-side sheet feeding to be fed from the long side of the sheet and in a short edge feed (SEF) mode indicating short-side sheet feeding to be fed from the short side of the sheet.

As shown in FIG. 3, the operation display control unit 110 generates icon images indicating clearly a processing result of the job (an icon image showing the result of the aggregation). In an exemplary implementation, processing circuitry of image processing apparatus 100 is configured to generate icon images. For example, when in the LEF mode as illustrated in element 310, the operation display control unit 110, processing circuitry, generates the icon image 330. Icon image 330 illustrates that when two pages are printed on a single side of a sheet along the long side of the sheet. The direction of the long side of icon image 330 is such a configuration, and the magnification ratio becomes maximum for the document in the LEF mode. In contrast, icon image 340 is an example of an improper configuration. While two pages are indicated on a single side of a sheet in icon image 340, they are not along the long side of the sheet such that the magnification ratio becomes maximum for the document. Thus, icon image 330 is an example of an exemplary icon image in an LEF mode and icon image 340 is an example of an improper icon image in an LEF mode.

FIG. 3 further illustrates exemplary generation of icon images in the SEF mode. For example, when in the SEF mode as illustrated in element 320, the operation display control unit 110 generates the icon image 350. Icon image 350 illustrates that when two pages are printed on a single side of a sheet along the short side of the sheet. The direction of the short side of icon image 350 is such a configuration, and the magnification ratio becomes maximum for the document in the SEF mode. In contrast, icon image 360 is an example of an improper configuration. While two pages are indicated on a single side of a sheet in icon image 360, they are not along the short side of the sheet such that the magnification ratio becomes maximum for the document. Thus, icon image 350 is an example of an exemplary icon image in an SEF mode and icon image 360 is an example of an improper icon image in an SEF mode.

Referring back to FIG. 2, the job control unit 120 controls the execution of the job. Specifically, the job control unit 120 executes the job received on the operation display control unit 110 by controlling the engine 16. For example, when the operation display control unit 110 receives a job start instruction and various setting information input with the job, the job control unit 120 instructs the engine 16 to start reading a document, start printing, and the like.

The history management unit 130 manages history information of job execution. Specifically, the history management unit 130 registers (stores) the icon image generated by the operation display control unit 110 in the storage device like the HDD 15 as a history together with the setting information of the job. The setting information is including information set by user, information set by automatically (size detection, direction detection and the like) or on default on the application (color setting and the like) executing the job. Further, the history management unit 130 acquires corresponding history information from the HDD 15 and responds to the operation display control unit 110. In response to an instruction to acquire history information from the operation display control unit 110.

Figure 4A:
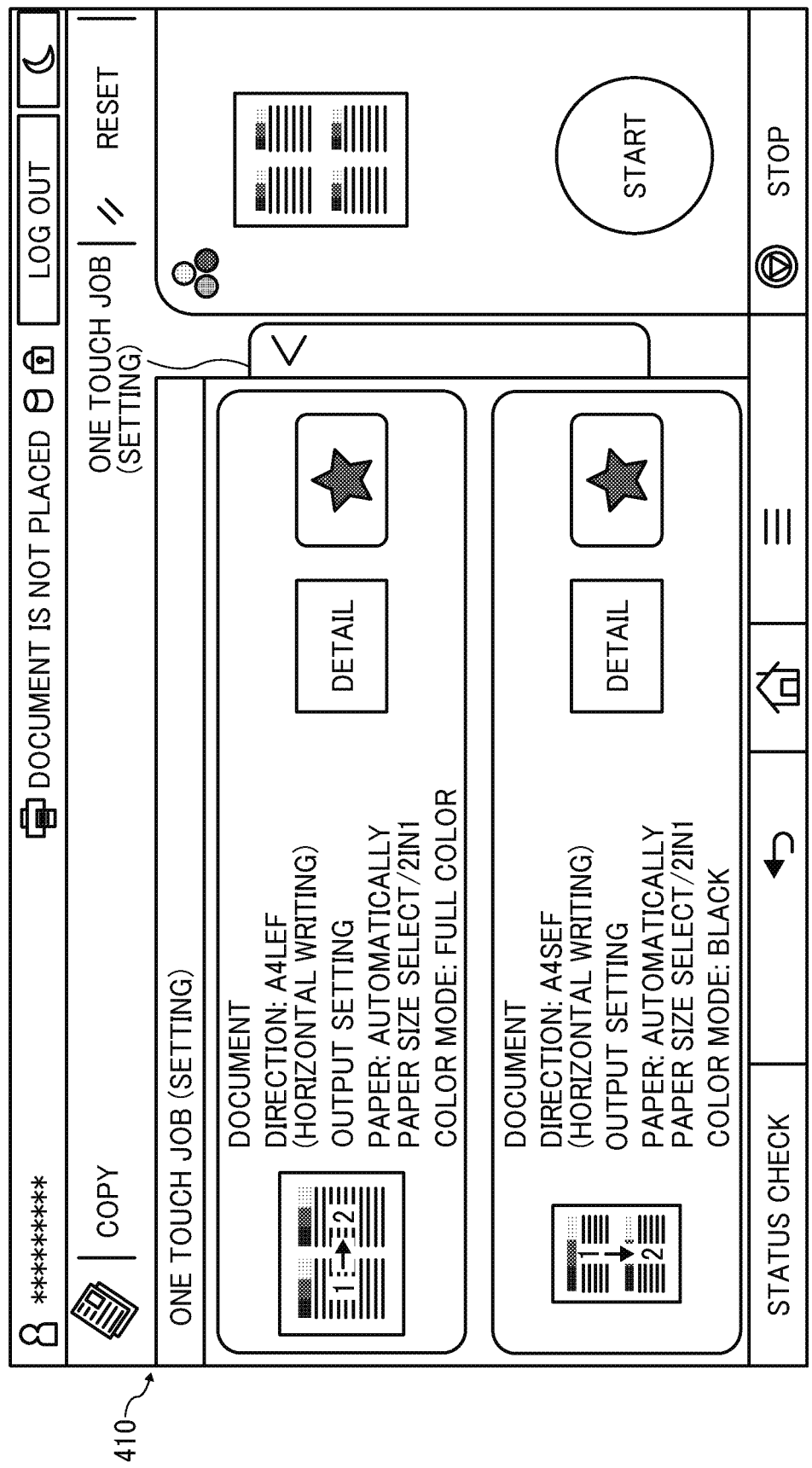
FIG. 4A is a diagram showing a display example of a history list screen at application startup.
Figure 4B:
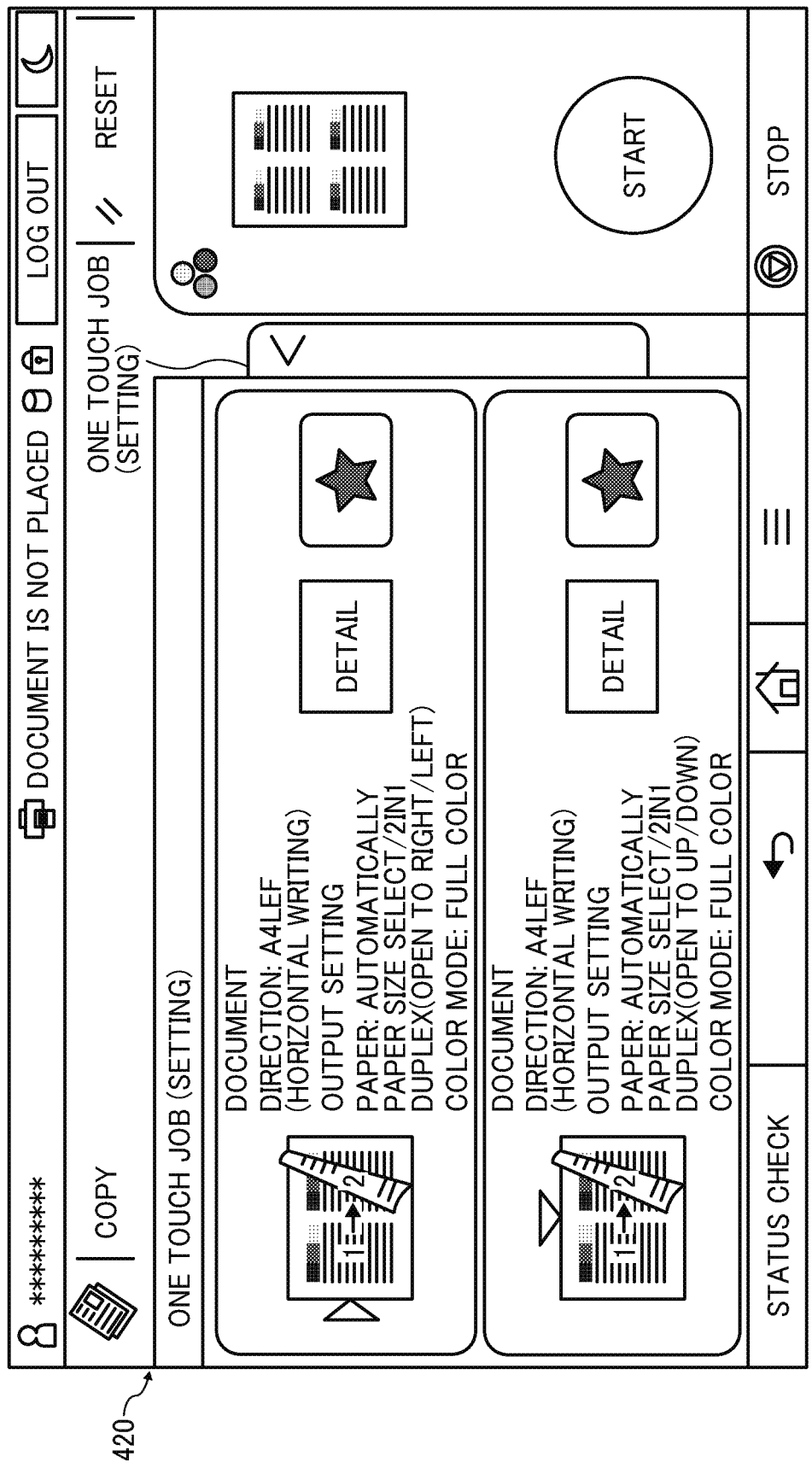
FIG. 4B is a diagram showing a display example of a history list screen at application startup.

With reference to FIGS. 4A and 4B, display examples of the history list screens 410 and 420 at application startup will be described. In FIG. 4A, an example of displaying the history list screen 410 of the aggregate copy is shown. Further, in FIG. 4B, an example of displaying the history list screen 420 of duplex copy is shown.

For example, after the operation panel receives initiation instruction of the application for selecting the aggregate (2 in 1) job, the operation display control unit 110 acquires the history information corresponding to (in relation to) the job and displays the history list screen 410 shown in FIG. 4A on the operation panel 17. Here, in FIG. 4A, since the document is not set yet, it can be seen that the history list screen 410 includes an icon image indicating the processing result of the aggregation in the SEF (upper setting icon) and the processing result by the aggregation in the LEF (lower setting icon).

For example, the operation display control unit 110 acquires history information corresponding to the job when an application is initiated. The application is a software to select the job or job settings for a duplex copy job. Further, the operation display control unit 110 displays the history list screen 420 shown in FIG. 4B on the operation panel 17. When the screen is displayed like the FIG. 4B, it is unknown which should be set "right-and-left opening" or "upward-and-downward opening" for duplex copy, so that icon images showing both processing results are included in the history list screen. The user selects one of the "left-right opening" icon image or the "up-and-down opening" icon image. As a result, in the image processing apparatus 100, the selected job is executed.

Figure 5A:
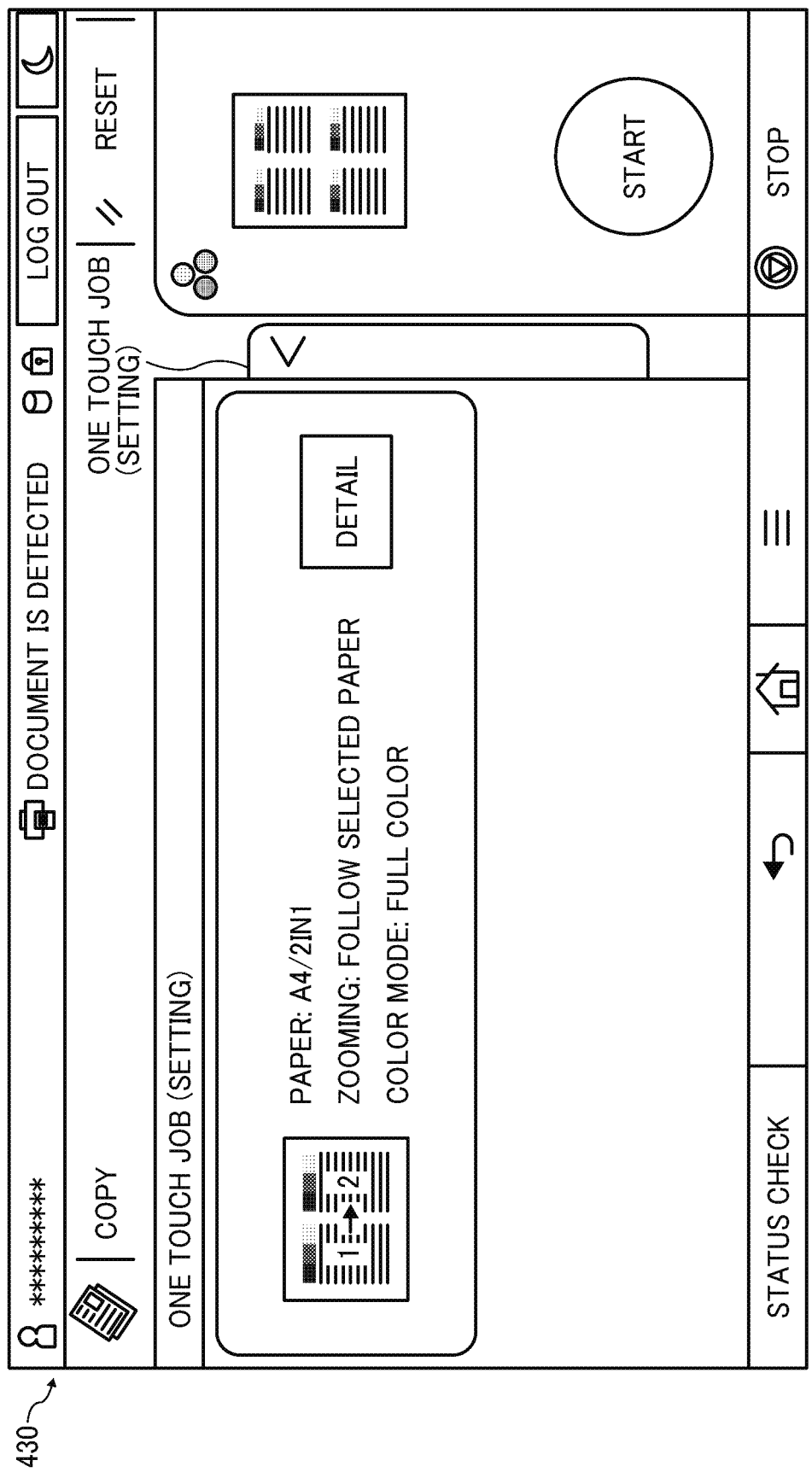
FIG. 5A is a diagram showing a display example of a history list screen after a document is set in a long edge feed mode.
Figure 5B:
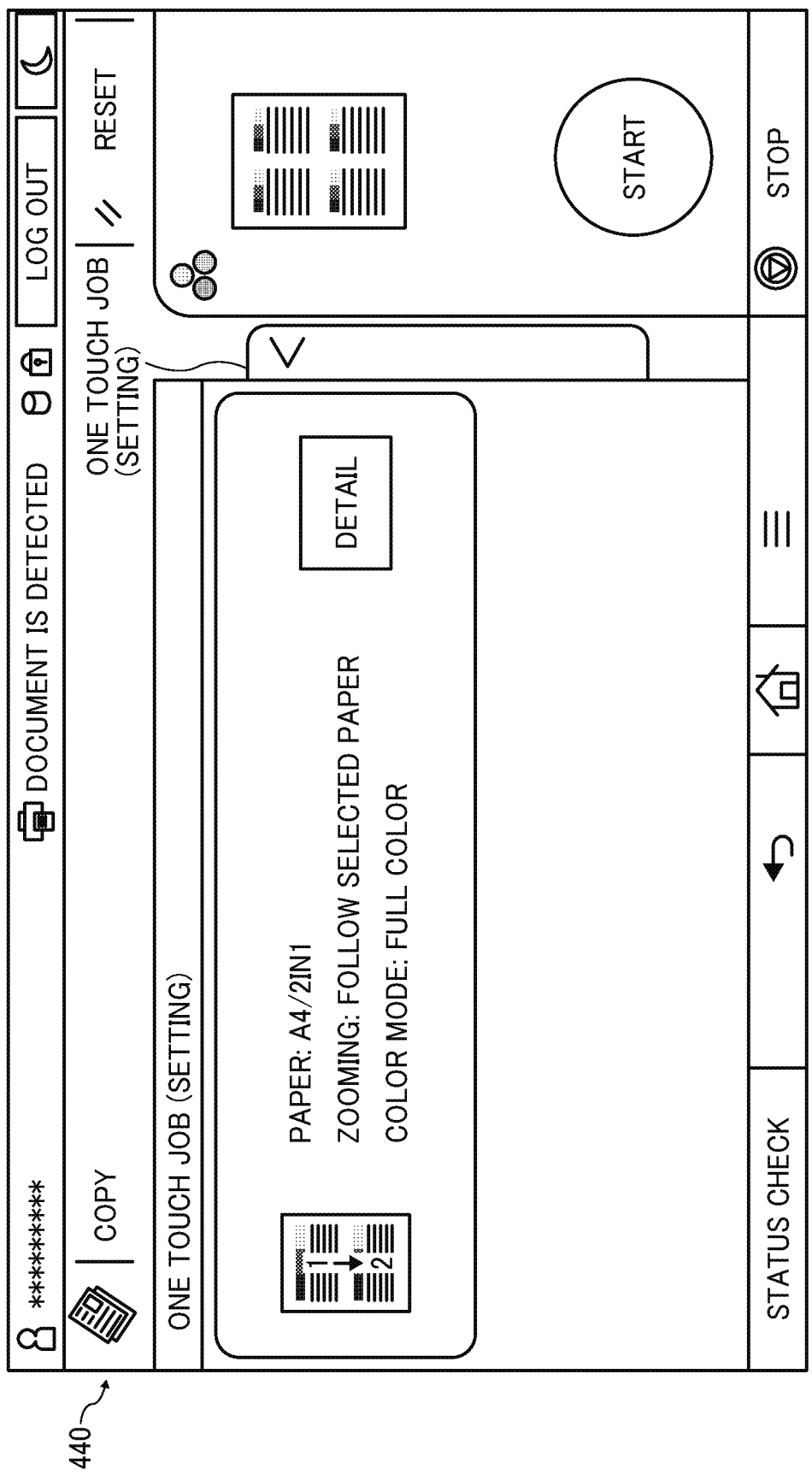
FIG. 5B is a diagram showing a display example of a history list screen after a document is set in a short edge feed mode.

Next, with reference to FIGS. 5A and 5B, display examples of the history list screens 430 and 440 after placing document on the scanner will be described. FIG. 5A is a diagram for explaining a display example of a history list screen 430 after the document is placed (set) in the LEF. FIG. 5B is a diagram for explaining a display example of a history list screen 440 after the document is placed (set) with the SEF.

For example, the operation display control unit 110 acquires the size or direction of document from the engine 16 that executes the scanner function, when the document has been set on the scanner in a situation that the operation display control unit 110 control to display the history list screen 430 on the operation panel 17 shown in FIG. 4A. For example, as shown in FIG. 5A, when the document is set as LEF, the operation display control unit 110 updates (narrow down) the history list screen 430 including the icon image only indicating the processing result of the aggregation in LEF.

For example, the operation display control unit 110 acquires the size or direction of document from the engine 16 that executes the scanner when the document is set on the scanner in a situation that the operation display control unit 110 controls to display the history list screen 430 on the operation panel 17 shown in FIG. 4A. When the document is set as SEF, as shown in FIG. 5B, the operation display control unit 110 updates (narrow down) the history list screen 440 including the icon image only indicating the processing result of the aggregation in SEF.

Figure 6:
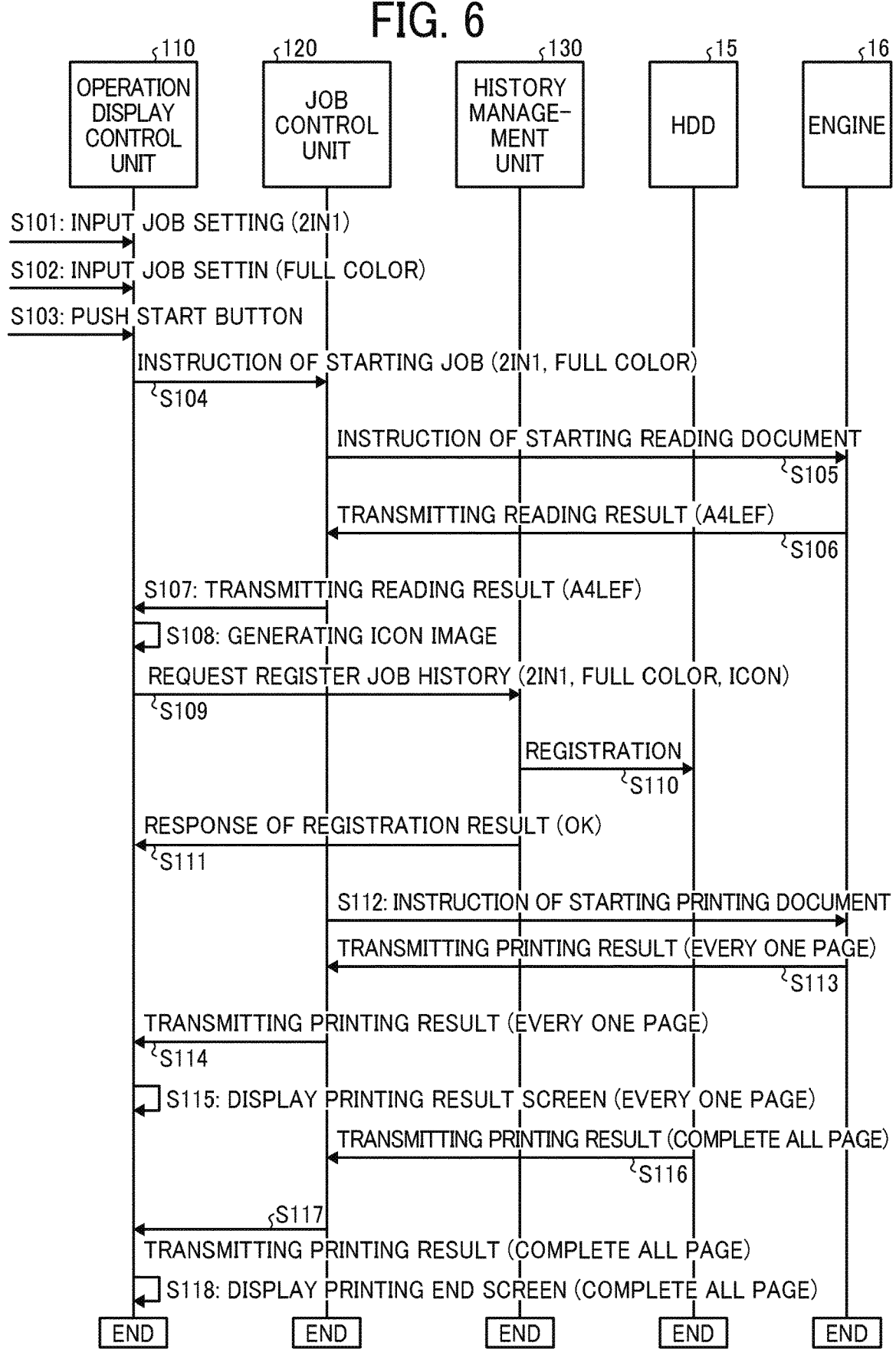
FIG. 6 is a sequence diagram showing an example of a flow of an icon creation process.

FIG. 6 is a sequence diagram showing an example of a flow of an icon creation process. As shown in FIG. 6, the operation display control unit 110 receives input of a job setting and pressing of a start key to start printing, by a user operation on the operation panel 17 (steps S101 to S103). For example, the job setting is aggregate (2 in 1) setting and FC (full color) setting. The operation display control unit 110 requests the job control unit 120 to start the job (step S104).

In response to the job start request from the operation display control unit 110, the job control unit 120 instructs the engine 16 that executes the scanner to start reading the document (step S105). As a result, the engine 16 executes the scanner to read the document. The job control unit 120 acquires (or receives) the document reading result (A4 and LEF) from the engine 16 that has read the document by executing the scanner (step S106). The job control unit 120 outputs (or transmit) the reading result of the document acquired from the engine 16 to the operation display control unit 110 (step S107).

When the operation display control unit 110 acquires (or receives) the document reading result from the job control unit 120, the operation display control unit 110 generates an icon image indicating the processing result based on the acquired document reading result including a document size, a document direction, a printed paper size, and a print setting. (step S108). Here, the operation display control unit 110 may generate a corresponding icon image by adding the document direction to the aggregation (2 in 1) of the copy operation. Further, the operation display control unit 110 may generate an icon image for both the case that the document direction is vertical (LEF or portrait) and horizontal (SEF or landscape).

For example, if the document set on the scanner is LEF and the aggregation (2 in 1) is set as a job setting, the operation display control unit 110 can generate the icon image including two pages side by side in horizontal direction in one icon, like shown in upper side of FIG. 4A. If the document set on the scanner is SEF and the aggregation (2 in 1) is set as a job setting, the operation display control unit 110 can generate the icon image including two pages up and down in vertical direction in one icon, like shown in lower side of FIG. 4A. The operation display control unit 110 outputs (or transmits) the generated icon image and the setting information of the job to the history management unit 130 (step S109).

The history management unit 130 registers (or stores) the icon image and the setting information of the job received from the operation display control unit 110, in the HDD 15, associating each the icon image and the setting information as the history (step S110). The history management unit 130 sends a registration result (OK) indicating that it is successfully registered in the HDD 15 to the operation display control unit 110 (step S111).

Further, the job control unit 120 instructs the engine 16 that executes the plotter (or printer) to start printing (step S112). As a result, the engine 16 that executes the plotter prints the document image of the document read by the scanner on a sheet. The job control unit 120 receives a print result from the engine 16 for each processing of one page (step S113). The job control unit 120 outputs (or transmits) the printing result (every 1 page) to the operation display control unit 110 (step S114). As a result, the operation display control unit 110 controls to display of the print result screen on the operation panel 17 for each processing of one page (step S115).

Subsequently, the job control unit 120 receives the print result indicating the completion of the print (step S116). The job control unit 120 outputs (or sends) the printing result (completion printing) to the operation display control unit 110 (step S117). As a result, the operation display control unit 110 controls to display the job end screen indicating that the job has ended on the operation panel 17 (step S118).

Figure 7:
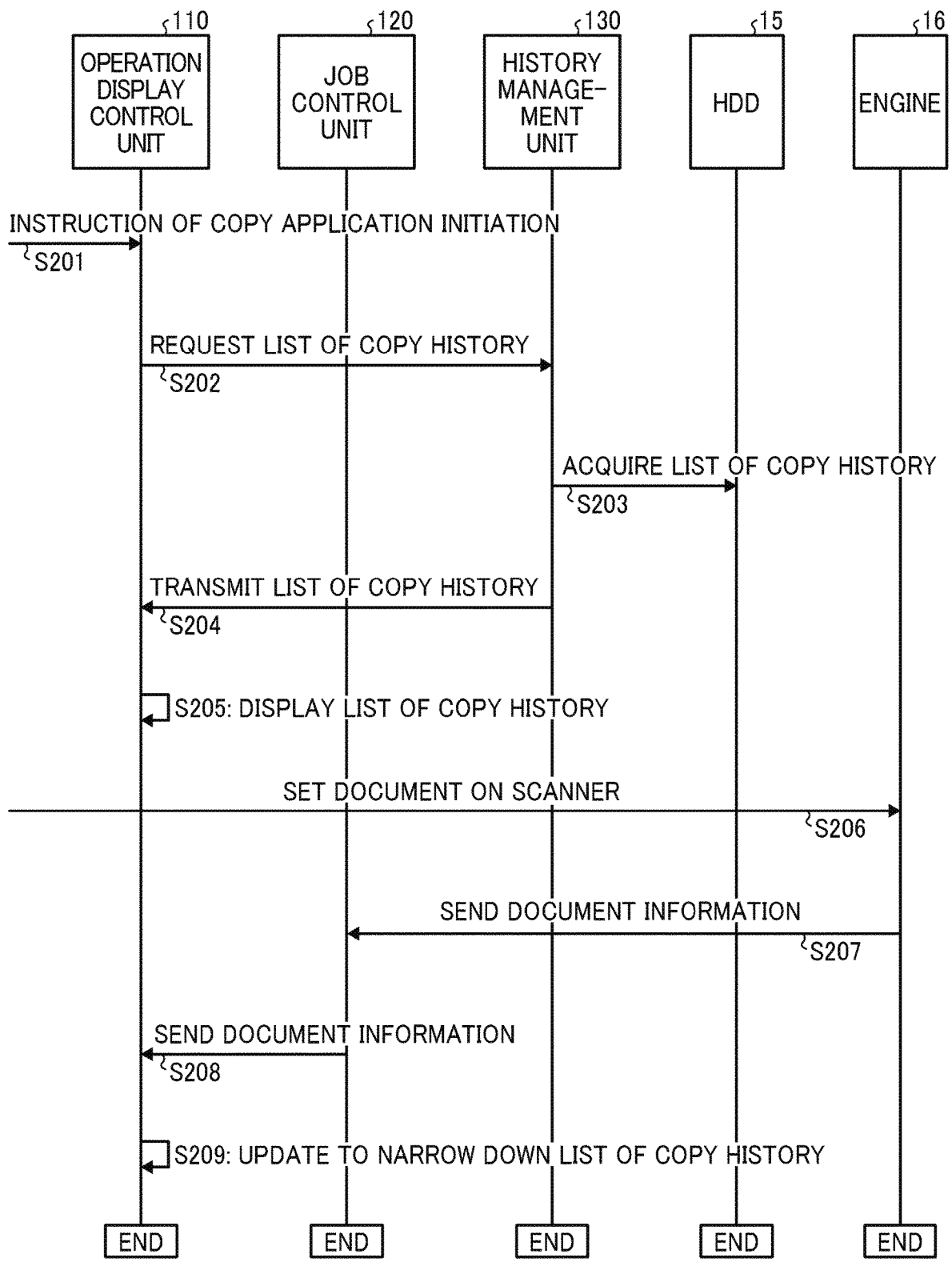
FIG. 7 is a sequence diagram showing an example of a flow of an icon display process.

Next, with reference to FIG. 7, the flow of the icon display process will be described. FIG. 7 is a sequence diagram showing an example of the flow of the icon display process. In FIG. 7, it is described an example that the document is not set at the time of starting the application.

As shown in FIG. 7, the operation display control unit 110 accepts initiation of an application to execute a copy job via the operation panel 17 (step S201). The operation display control unit 110 instructs the history management unit 130 to send a history list corresponding to the copy job (step S202). In response to this request, the history management unit 130 acquires the corresponding history list from the HDD 15 (step S203). The history management unit 130 sends the information of the history list acquired from the HDD 15 to the operation display control unit 110 (step S204).

The operation display control unit 110 control to display the screen of the history list including the icon image on the operation panel 117 (step S205). When the user sets the document on the scanner (step S206), the job control unit 120 acquires (or receive) the document size and/or direction, in other words the document information from engine 16 that executing scanner to read the document (step S207). The job control unit 120 outputs (or transmits) the acquired document information to the operation display control unit 110 (step S208). The operation display control unit 110 updates (narrow down) the screen of the history list as displaying icon image only including that indicating the acquired document information (step S209).

Figure 8:
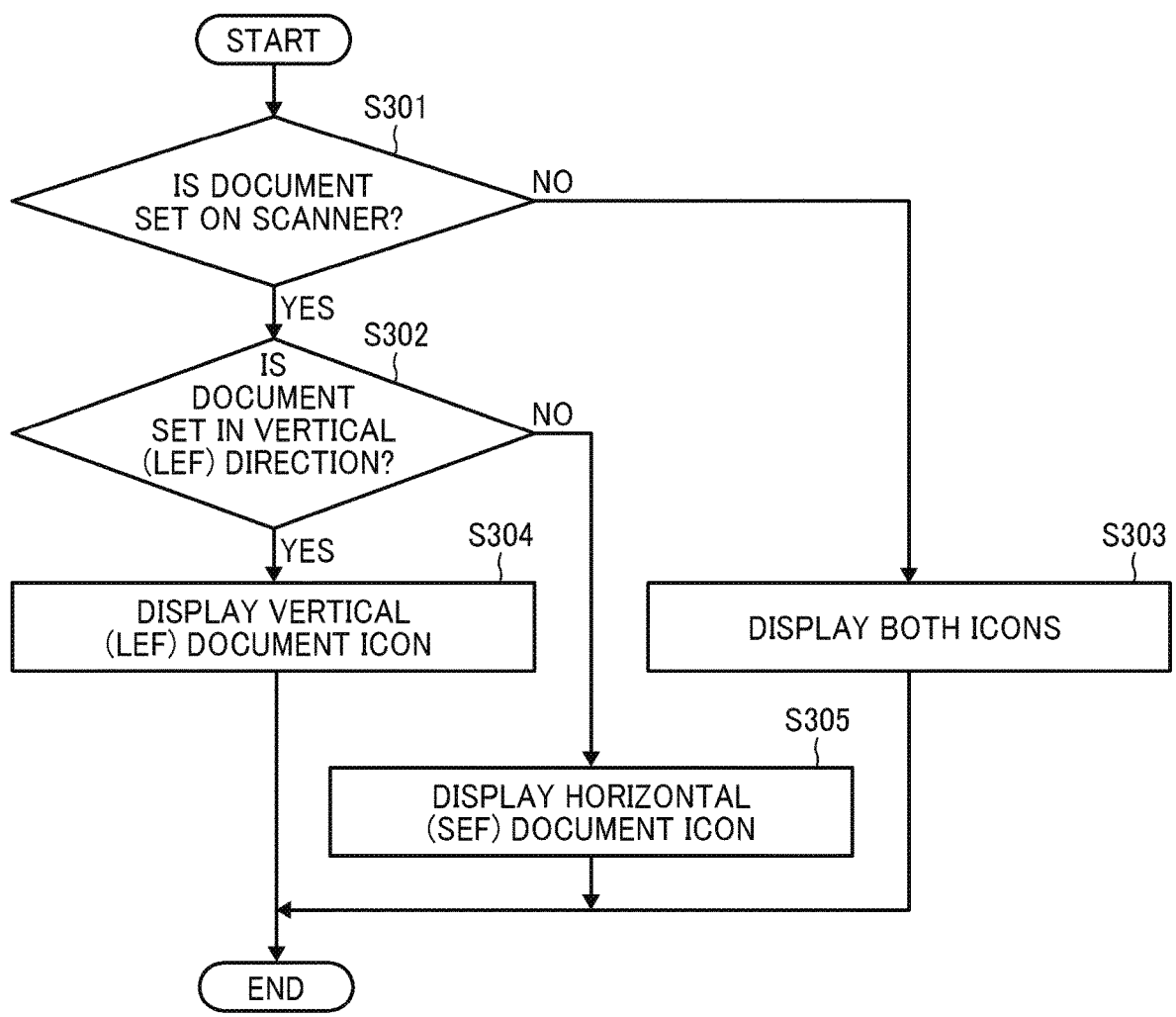
FIG. 8 is a flowchart showing an example of a flow of icon display processing according to a document setting situation.

Next, with reference to FIG. 8, the flow of the icon display processing according to the document set situation will be described. FIG. 8 is a flowchart showing an example of a flow of the icon display process.

As shown in FIG. 8, processing circuitry of the image processing apparatus 100 determines whether a document is set (placed) on the scanner (step S301). For example, the processing circuitry determines whether a document is set or not, depending on a detecting status by the engine 16 that executes the scanner function by using scanner. At this time, when a document is set (placed) (step S301: Yes), the processing circuitry determines which direction is the document is set, i.e. in a vertical (LEF) direction or in a horizontal (SEF) direction (step S302). On the other hand, when a document is not set (step S301: No), the image processing apparatus 100 can not specify that the document is the vertical document or the horizontal document at this time, so that the image processing apparatus 100 displays both icon images, indicating a processing result of the vertical document copy and the horizontal document copy. (step S303).

Further, when the set document is a vertical (LEF) document (step S302: Yes), the image processing apparatus 100 displays only the icon image (copy setting button) that indicates the copy settings based on the processing result when copying with the vertical document was executed (step S304). On the other hand, when the document is a horizontal (SEF) document (step S302: No), the image processing apparatus 100 displays only the icon image (copy setting button) that indicates the copy settings based on the processing result when copying with the horizontal document was executed (step S305). If the document is removed after setting the document before starting scan, the history list screen including all icon images (copy setting button) is displayed.

As described above, the image processing apparatus 100 generates an icon image for indicating the processing result of the job based on the reading result of the document according to the job settings including a document size, a document direction, a printed paper size, and a print setting. The image processing apparatus 100 stores the created icon image and the setting information of the job, and acquires the corresponding icon image and setting information from the storage device when a start operation of an application for selecting a job is accepted, and displays a history list screen on which a job can be selected. As a result, the image processing apparatus 100 clearly outputs a processing result of the image processing for a user.

In addition, the image processing apparatus 100 displays a history list (copy setting list) screen including all corresponding icon images when the document is not set on the scanner, and updates (narrow down) the history list including only the corresponding icon image according to the set document direction when setting the document on the scanner. Therefor the user can know whether the document has been set so that the desired processing result can be obtained. Further, the image processing apparatus 100 can prevent copying in wrong direction by user.

In one aspect, the image processing program executed by the image processing apparatus 100 may be provided by a computer readable recording medium, such as a CD-ROM, a flexible disk (FD), a CD-R, a DVD (Digital Versatile Disk) or the like. Further, the image processing program executed by the image processing apparatus 100 may be stored on an external computer connected to a network such as the Internet and be provided (or distributed by) by being downloaded via a network to image processing apparatus.

Although the embodiments of the present invention have been described in detail above, the present application is not limited to such a specific embodiment and variations and modifications may be made without departing from the scope of the present invention. In addition, information including processing procedures, control procedures, specific names, various data, parameters, and the like shown in the above documents, drawings, and the like can be arbitrarily changed. Each element of the illustrated apparatus does not necessarily need to be physically configured as illustrated in the figure. That is, specific forms of devices are not limited to shown in the drawings, and all or a part of the device may be distributed or integrated functionally or physically in arbitrary units according to various burdens, usage situations, or the like. For example, the operation display control unit 110 includes a "generating unit" for generate an icon image for indicating a processing result of a job based on the reading result of the document, and a "display control unit" for displaying a history list screen on which a job can be selected.

The above descriptions of an image processing apparatus and device are just examples, and various modifications, replacements, or combinations can be made without departing from the scope of the present disclosure by persons skilled in the art. Obviously, numerous modifications and variations of the present application are possible in light of the above teachings. It is therefore to be understood that within the scope of the appended claims, the invention may be practiced otherwise than as specifically described herein.

The invention claimed is:

1. An image processing apparatus, comprising:
a memory;
an operation panel; and
processing circuitry configured to
receive a first operation input, via the operation panel, to execute a job utilizing a scanner;
execute the job by controlling the scanner to scan a document;
generate a display component that is associated in a one-to-one correspondence with the job, wherein setting information includes a plurality of particular setting values associated with a corresponding plurality of setting items used to execute the job, and the display component includes an image that differs based on the plurality of particular setting values associated with the corresponding plurality of setting items used to execute the job;
register, in the memory, history information that indicates the display component that includes the image corresponding to the plurality of particular setting values included in the setting information;
receive a second operation input, via the operation panel, to initiate a job execution application to select the display component;
acquire the display component and the setting information from the history information stored in the memory;
control the operation panel to display a screen including the display component corresponding to the setting information in a history list, the display component in the history list being selectable on the screen as a new job setting; and
execute a next job according to the new job setting when the new job setting is selected via the operation panel, wherein
the history list includes the display component as well as one or more selectable components, and
the processing circuitry is further configured to update the screen displaying the history list to narrow down the selectable components according to document information that is detected when the document be set on the scanner so that only components of the history list that have a corresponding image that corresponds to the detected document information of the document are displayed on the screen.

2. The image processing apparatus according to claim 1, wherein the plurality of setting items includes one or more of a document size, a document direction, a printed paper size, and a print setting of the document.

3. The image processing apparatus according to claim 1, further comprising the scanner.

4. The image processing apparatus according to claim 1, wherein
when a processing result indicates that the document is printed in portrait, the processing circuitry is further configured to generate the display component to indicate a portrait mode, and
when the processing result indicates that the document is printed in landscape, the processing circuitry is further configured to generate the display component to indicate a landscape mode.

5. The image processing apparatus according to clair wherein
when a processing result indicates that the document is printed in duplex, the processing circuitry is further configured to generate the display component to indicate a duplex mode, and
when the processing result indicates that the document is printed on a single side, the processing circuitry is further configured to generate the display component to indicate a single side mode.

6. The image processing apparatus according to claim 1, wherein
when a processing result indicates that the document is read in a short edge feed, the processing circuitry is further configured to generate the display component to indicate a short edge feed mode, and when the processing result indicates that the document is read in a long edge feed, the processing circuitry is further configured to generate the display component to indicate a long edge feed mode.

7. The image processing apparatus according to claim 1, wherein when a processing result indicates that two pages of the document are printed on a single side, the processing circuitry is further configured to generate the display component to indicate a two-page-in-one mode.

8. The image processing apparatus according to claim 1, wherein when a processing result indicates a sheet size of the document, the processing circuitry is further configured to generate the display component to indicate a sheet size.

9. An image processing method, comprising:
receiving a first operation input, via an operation panel of an image processing apparatus, to execute a job utilizing a scanner;
executing, by processing circuitry of the image processing apparatus, the job by controlling the scanner to scan a document;
generating, by the processing circuitry, a display component that is associated in a one-to-one correspondence with the job, wherein setting information includes a plurality of particular setting values associated with a corresponding plurality of setting items used to execute the job, and the display component includes an image that differs based on the plurality of particular setting values associated with the corresponding plurality of setting items used to execute the job;
registering, in a memory, history information that indicates the display component that includes the image corresponding to the plurality of particular setting values included in the setting information;
receiving a second operation input, via the operation panel, to initiate a job execution application to select the display component;
acquiring the display component and the setting information from the history information stored in the memory;
controlling the operation panel to display a screen including the display component corresponding to the setting information in a history list, the display component in the history list being selectable on the screen as a new job setting; and
executing a next job according to the new job setting when the new job setting is selected via the operation panel, wherein
the history list includes the display component as well as one or more selectable components, and
the method further comprises updating the screen displaying the history list to narrow down the selectable components according to document information that is detected when the document be set on the scanner so that only components of the history list that have a corresponding image that corresponds to the detected document information of the document are displayed on the screen.

10. The image processing method according to claim 9, wherein the plurality of setting items includes one or more of a document size, a document direction, a printed paper size, and a print setting of the document.

11. The image processing method according to claim 9, further comprising:
generating, when a processing result indicates that the document is printed in portrait, the display component to indicate a portrait mode; and
generating, when the processing result indicates that the document is printed on a landscape side, the display component to indicate a landscape mode.

12. The image processing method according to claim 9, further comprising:
generating, when a processing result indicates that the document is printed in duplex, the display component to indicate a duplex mode; and
generating, when the processing result indicates that the document is printed on a single side, the display component to indicate a single side mode.

13. The image processing method according to claim 9, further comprising:
generating, when a processing result indicates that the document is read in a short edge feed, the display component to indicate a short edge feed mode; and
generating, when the processing result indicates that the document is read in a long edge feed, the display component to indicate a long edge feed mode.

14. The image processing method according to claim 9, further comprising generating, when a processing result indicates that two pages of the document are printed on a single side, the display component to indicate a two-page-in-one mode.

15. The image processing method according to claim 9, further comprising generating, when a processing result indicates a sheet size of the document, the display component to indicate a sheet size.

16. An image processing apparatus, comprising:
processing circuitry configured to
receive a first operation input, via an operation panel, to execute a job utilizing a scanner;
execute the job by controlling the scanner to scan a document;
generate a display component that is associated in a one-to-one correspondence with the job, wherein setting information includes a plurality of particular setting values associated with a corresponding plurality of setting items used to execute the job, and the display component includes an image that differs based on the plurality of particular setting values associated with the corresponding plurality of setting items used to execute the job;
register, in a memory, history information that indicates the display component that includes the image corresponding to the plurality of particular setting values included in the setting information;
receive a second operation input, via the operation panel, to initiate a job execution application to select the display component;
acquire the display component and the setting information from the history information stored in the memory;
control the operation panel to display a screen including the display component corresponding to the setting information in a history list, the display component in the history list being selectable on the screen as a new job setting; and
execute a next job according to the new job setting when the new job setting is selected via the operation panel, wherein
the history list includes the display component as well as one or more selectable components, and
the processing circuitry is further configured to update the screen displaying the history list to narrow down the selectable components according to document information that is detected when the document be set on the scanner so that only components of the history list that have a corresponding image that corresponds to the detected document information of the document are displayed on the screen.

17. The image processing apparatus according to claim 16, wherein the plurality of setting items includes one or more of a document size, a document direction, a printed paper size, and a print setting of the document.

* * * * *